United States Patent [19]

Zanetti

[11] Patent Number: 4,831,925
[45] Date of Patent: May 23, 1989

[54] AUTOMATIC TRIMMING MACHINE, PARTICULARLY FOR HORTICULTURAL PRODUCTS

[76] Inventor: Elio Zanetti, Via Mazzolini 9, 31049 Valdobbiadene, Italy

[21] Appl. No.: 79,058

[22] Filed: Jul. 29, 1987

[30] Foreign Application Priority Data

Aug. 4, 1986 [IT] Italy .............................. 82568 A/86

[51] Int. Cl.⁴ ........................................... A23N 15/00
[52] U.S. Cl. ..................................... 99/636; 99/637; 99/643
[58] Field of Search ................................. 99/635–637, 99/638, 642, 643, 546; 83/104, 732

[56] References Cited

U.S. PATENT DOCUMENTS

| 1,098,398 | 6/1914 | Phinney | 99/636 |
| 1,777,384 | 10/1930 | Smith | 99/636 |
| 2,192,838 | 3/1940 | McGraw | 99/636 X |
| 3,670,792 | 6/1972 | Claussen | 99/643 |

Primary Examiner—Timothy F. Simone
Attorney, Agent, or Firm—Guido Modiano; Albert Josif

[57] ABSTRACT

Stemming machine, particularly for horticultural products, comprising a conveyor belt composed of a plurality of individual containers which are swivelling and guided on counterposed and sequential inclined planes. The machine furthermore comprises stations for cutting at a selective depth, as well as means adapted to secure said products within said containers during the cutting steps.

16 Claims, 3 Drawing Sheets

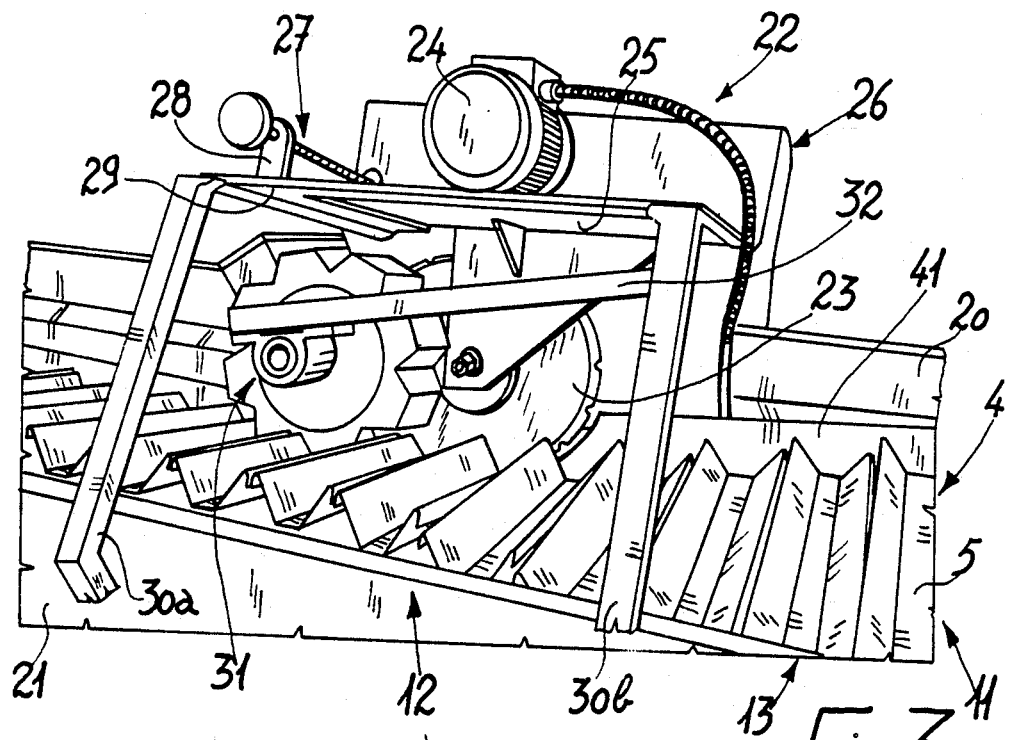
Fig. 3
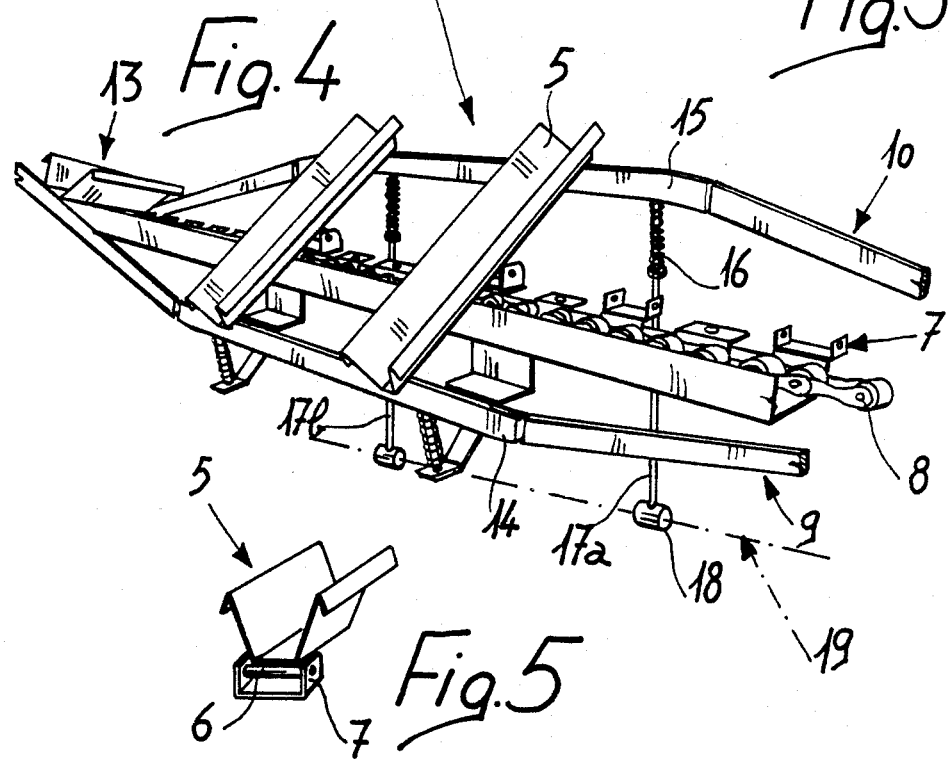
Fig. 4
Fig. 5

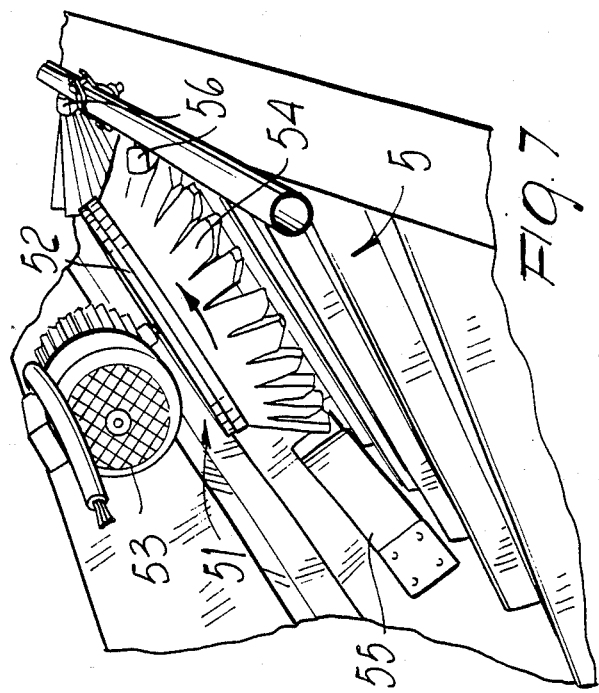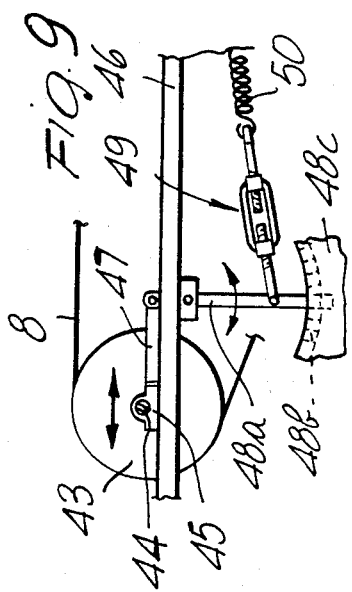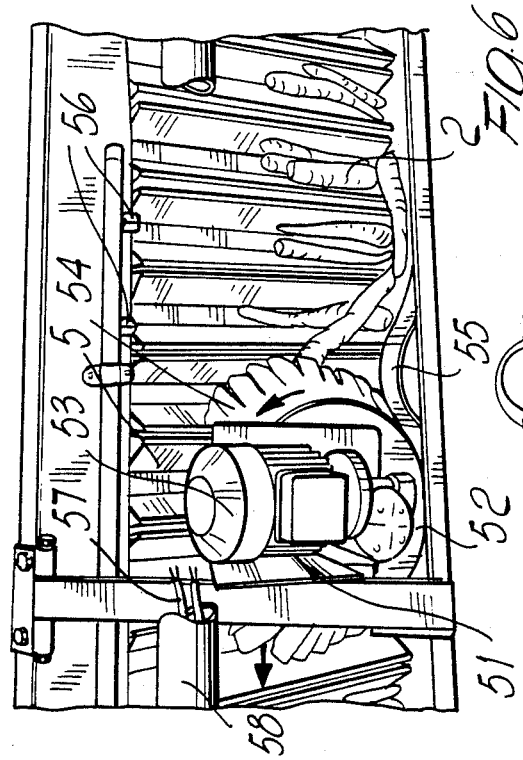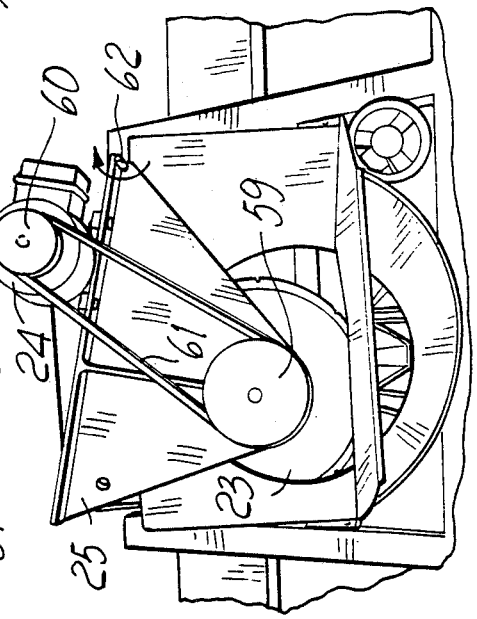

AUTOMATIC TRIMMING MACHINE, PARTICULARLY FOR HORTICULTURAL PRODUCTS

BACKGROUND OF THE INVENTION

The present invention relates to a automatic trimming machine, particularly usable for horiticultural products.

Currently, if horticultural products such as for example courgettes, cucumbers, carrots, etc., are to be treated, it is necessary for the same to be processed beforehand to remove their ends.

These ends are in fact not edible and therefore must be eliminated before any cutting and/or cooking and/or packaging steps.

Currently this trimming of horiticultural products is usually performed manually, using personnel the cost whereof is such as to considerably affect the overall processing cost of these products.

The only machine used for cutting the ends of said products is a circular blade: this however always leaves in any case to an operator the steps of taking the products and of placing the same next to said blade.

SUMMARY OF THE INVENTION

The main aim of the present invention is therefore to eliminate the disadvantages described above in known types, by devising a machine which allows to perform the cutting of the ends of horticultural products such as courgettes, cucumbers, carrots, etc., automatically without the intervention of personnel.

Within the scope of the above described aim, an important object is to devise a machine which, taking said products, also allows a correct positioning thereof in the cutting step.

Another important object is to provide a machine which adds to the preceding characteristics that of being able to achieve a high productivity.

The aim and the objects described above, as well as others which will become apparent hereinafter, are achieved by a stemming machine, particularly for horticultural products, characterized in that it comprises a conveyor belt composed of a plurality of individual swivelling containers sliding on sequential counterposed inclined guide means, said machine comprising at least two stations for cutting according to an adjustable depth at the most inclined regions of said containers, with said machine there being associated means for the positioning and the securing of said products within said containers.

BRIEF DESCRIPTION OF THE DRAWINGS

Further characteristics and advantages of the invention will become apparent from the description of a particular, but not exclusive, embodiment, illustrated only by way of non-limitative example in the accompanying drawings, wherein:

FIG. 3 is a perspective view of one of the cutting stations;

FIG. 4 is a view of the guides whereon the containers slide and the means for their movement;

FIG. 5 is a cross section view of a container;

FIGS. 6 and 7 are respectively top and lateral perspective views of further means for the correct positioning of the horticultural products within the containers;

FIG. 8 is a lateral view of an oscillating cutting station; and

FIG. 9 finally is a view of a chain tensioner applied to the machine.

DESCRIPTION OF THE PREFERRED EMBODIMENTS

Figure 1:
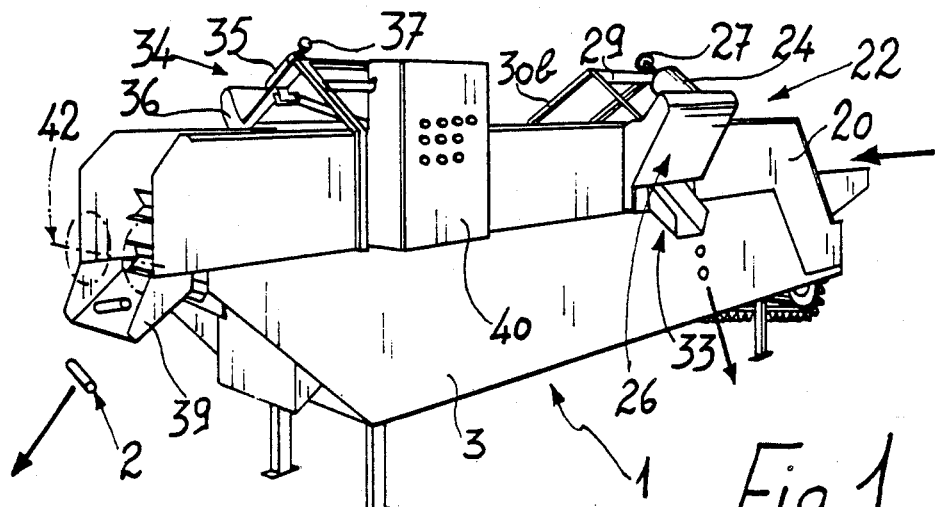
FIG. 1 is a perspective side view of the machine.
Figure 2:
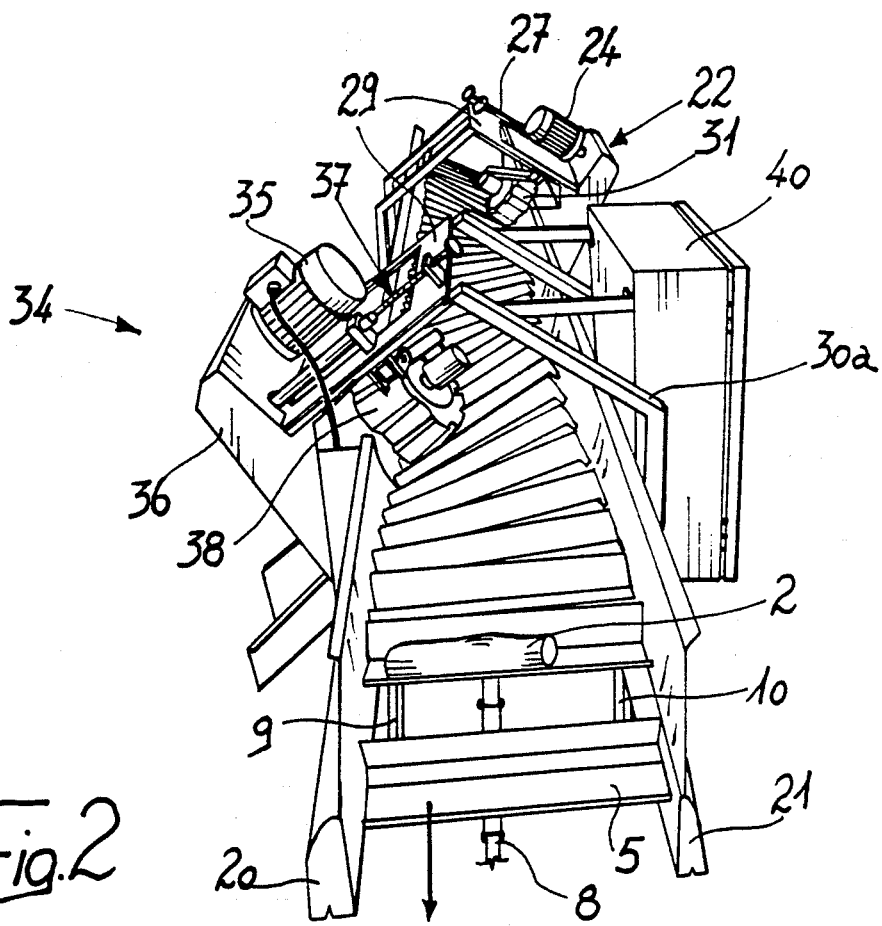
FIG. 2 is a perspective front view of the machine from the front end thereof wherefrom the processed product exits.

With reference to the above described drawings, the reference numeral 1 indicates a trimming machine particularly usable for horticultural products, indicated by the numeral 2, such as cucumbers, courgettes, carrots, eggplants, etc.

Said machine 1 comprises a framework 3 which supports a motorized conveyor belt 4 which in turn consists of a plurality of individual containers 5 arranged side by side to one another.

These containers are composed of a cup with an essentially V-shaped transverse cross section, and have such dimensions as to accommodate horticultural products having lengths or diameters different from one another.

At its transverse middle axis, each of said containers 5 is provided with elements for connection to means for moving the belt, consisting of rods 6 welded at the lower surface thereof.

Each of said rods is pivoted to the flaps of a connecting element consisting of an essentially U-shaped section 7, said section being retained on a chain 8 which constitutes, together with a suitable motor, the means for the movement of the belt 4.

During the movement of said belt, the lateral ends of each individual container 5 rest on adapted lateral guides 9 and 10.

These guides are arranged so that the containers 5 which are slideable thereon have a variable plane of arrangement according to the movement of said belt, said containers 5 being arranged, in a first region 11, on a horizontal plane, then, in a second region 12, on a transversely inclined plane, subsequently passing in a third region 13 wherein said containers are arranged on a plane inclined in the opposite direction with respect to that of said second region.

This arrangement of the guides 9 and 10 is illustrated in FIG. 4, which points out that these guides 9 and 10 have, at each of the regions 12 and 13, two portions 14 and 15 mechanically uncoupled from said guides.

In fact, two rods 17a and 17b are associated at one end with an eccentric element 18 rotated by a shaft 19 keyed on an adapted motor, and are connected to these portions 14 and 15 by means of an interposed elastically deformable element consisting of a spring 16.

A vibrating assembly is thus defined wherein the portions 14 and 15 transmit to the individual containers 5 an alternate periodic motion such as to position the horticultural products contained therein alternately adjacent to the lateral walls 20 and 21 of the framework 3 between which slides the belt 4.

At the wall 20 and adjacent to it in the second region 12 of maximum inclination, a first cutting station 22 is provided and consists of a rotating blade 23 which is movable along planes parallel with respect to said wall 20.

Said blade is operated by an electric motor 24, rigidly associated with a plate 25 which is slideable with respect to a first small frame 26 projecting from the wall 20, the movement along planes parallel to that of said wall 20 being allowed by a screw 27 an end whereof is connected to the plate 25, the other end interacting with a complementarily threaded sleeve 28 rigidly associated with a bar 29 transversely coupled to a pair of lateral uprights 30a and 30b and the ends whereof are associated respectively with the first frame 26 and with the wall 21 of the framework 3.

A means for the securing of the products 2 in the containers 5 before and during the cutting step is associated with the plate 25.

Said means consists of a toothed wheel 31 adjacent to the rotating blade 23 and interacting with the products before the blade.

The teeth of the wheel are in fact shaped complementarily with respect to the seats of the containers 5 and are preferably made of elastically deformable plastic material so as to avoid ruining the product's shape, adapting thereto.

The toothed wheel 31 is pivoted to an arm 32 associated with the plate 25 and projecting below it.

Once the products are placed in the containers 5, for example by means of a conveyor belt which takes said products from a hopper, the products tend to place themselves by gravity against the wall 20 when said containers begin to arrange themselves inclined upon reaching the first region 12.

This settling is ensured by the vibratory motion imparted to the portions 14 and 15 of the guides 9 and 10.

In the motion of the belt, the products interact with the toothed wheel 31 which secures them in the correct position during the step of cutting one of their ends by means of the blade 23.

The cut-off pieces fall onto a conveyor 33 underlying the region of said blade.

After passing the second region 12, the products, one end whereof is already cut, are carried by the belt 4 to the third region 13 wherein the containers are arranged again inclined, but on the opposite side with respect to the previous one, so that the still uncut end of the product arranges itself adjacent to the wall 21.

At this point a second cutting station 34, similar to the preceding one and arranged adjacent to the wall 21, is provided.

Also in this case, the station consists of a rotating blade, movable along planes which are parallel to that of the wall 21, and is operated by a motor 35 rigidly associated with a plate which is slideable with respect to a second small frame 36.

Naturally, a screw 37 similar to the one 27 is provided for the positioning of the blade according to the desired cutting depth.

A means for the securing of the products 2 in the containers 5 before and during the cutting step, consisting of a second toothed wheel 38 arranged adjacent to the blade, is associated with the plate.

This wheel is provided with teeth which are shaped complementarily with respect to the seats of the containers 5 and are made of elastically deformable plastic material so as to avoid ruining the horticultural products, adapting thereto.

After passing the second region 14, the belt 4 unloads the stemmed products through a duct 39 provided at the terminal end of the machine 1.

The machine is furthermore provided with a control panel 40 to operate the motors 24, 33 and of the motors which drive the chain 8 and the shaft 19.

Thus, for example, the selected cutting depth can be obtained by moving a partition 41 which is movable with respect to the ends of the containers 5 and to the plane of arrangement of the lateral walls 20 and 21.

The spacing of this wall 41 from the ends of the containers determines the cutting depth, since the products rest one of their ends on this wall.

Moreover, a two-blade third cutting station 42 adapted to further cut the processed product which exits from the machine 1 is conveniently provided at the terminal end of the conveyor belt 4.

The blades of this station are arranged on planes perpendicular to the plane of arrangement of the containers 5 facing said station so as to reduce the length of the processed products and to allow, for example, their successive conveyance to a dicing or slicing machine.

It has thus been observed that the invention achieves the intended aim and objects, a machine having been obtained which allows to cut the terminal ends of products such as courgettes, cucumbers and carrots automatically and rapidly.

The processing costs are thus considerably reduced, obtaining output products ready for the subsequent operations, which vary according to the destination of said products.

Finally, the products obtained have uniformly precise stemmed ends by virtue of the inclination imparted to the containers 5 and of the vibratory motion imparted to the same in the regions of greater inclination.

Naturally, the invention is susceptible to numerous modifications and variations, all of which are within the scope of the same inventive concept. Thus, for example, the chain 8, which has a loop-like configuration, is entrained at the ends of the machine on adapted crown wheels 43, at least one whereof is a driving crown wheel, its shaft 44 being pivoted on a slider 45 which is movable on a side member 46 of the framework and is articulated, by means of an arm 47, to the end of a rod 48a, also pivoted eccentrically to the framework 3 and, at the other end, to an adjustable tensioning element 49 connected to the framework 3 by means of a spring 50. The optimum tensioning of the chain 8 during the operation of the machine is thus obtained. At the free end of the rod 48a a small tooth is provided which interacts with a rack 48b associated with an element 48c rigidly associated with the frame work so as to cause the unidirectional tensioning of the chain.

FIGS. 6 and 7 instead illustrate further means for the correct positioning of the horticultural products 2 within the containers 5: they consist of three straightening brushes arranged above the containers 5, of which two are positioned side by side between the machine inlet end for the product to be stemmed and the toothed wheel 31 and the third is arranged between the first cutting station 22 and the second toothed wheel 38.

Each of said brushes, indicated by the numeral 51, is rigidly associated with a disc 52, arranged on a plane approximately parallel to the plane of arrangement of the underlying inclined containers 5, and rotating by means of an adapted motor 53.

Said brush is provided with a plurality of elastic appendages 54 skimming the containers, their function being to pull along, straightening them, the horticultural products 2 arranged transversely with respect to said containers 5.

In order to facilitate this operation, the brushes are arranged adjacent to the lateral wall of the machine whereon rest the horticultural products 2, on said wall there being provided, before the brush, a guide 55 adapted to remove from said wall the horticultural products 2 arranged longitudinally with respect to said machine.

Moreover, in order to facilitate the sliding of the horticultural products 2 within the containers 5, a water system is provided having fan-like nozzles 56.

Advantageously, the electrical plant of the machine is accordingly made waterproof by havig the conductors 57 pass within an adapted duct 58 arranged above the conveyor belt.

FIG. 8 illustrates a cutting station wherein the rotating blade 23 has its shaft pivoted to a plate 25, also supporting the electric motor 24. The pulleys 59 and 60 for the transmission of the motion by means of the belt 61 are keyed to said shaft and said electric motor.

The plate 25 is advantageously pivoted at one end to a pivot 62 projecting from said framework, parallel and eccentric to the pivoting shaft of the rotating blade 23. Said blade can thus oscillate for example if it makes contact with foreign objects, such as a stone.

The materials, as well as the dimensions of the individual elements constituting the machine, may also be the most adapted according to the specific requirements.

What is claimed is:

1. Automatic trimming machine, particularly for elongate horticultural products having tips and stems, comprising:

a supporting main frame;

an endless conveyor belt mounted on said main frame, said conveyor belt having an input end and an output end, and defining a direction of advancement;

a plurality of elongate containers, said containers each having a bottom and accomodating at the bottom thereof at least one product to be trimmed, said containers having ends and being arranged side by side lengthwise of said conveyor belt for swivelling about axes substantially parallel to said direction of advancement of said conveyor belt;

at least a pair of lateral guide members extending longitudinally of said main frame underneath of said containers for slidably supporting them thereby causing said containers to swivel during advancement thereof from a first substantially horizontal position region, through a second inclined position region, through a third region in which the containers are oppositely inclined with respect to said second inclined position, to a forth substantially horizontal position region;

means for imparting vibrations to said lateral guide members to cause products to be trimmed to slide along said containers toward said second inclined region and said third region thereof;

at least two trimming stations for respectively cutting tips and stems of products on said conveyor belt at locations corresponding to said second inclined position region and said third region of said lateral guide members said at least two trimming stations including a first trimming station and a second trimming station;

abutment means for adjusting the cutting depth of said trimming stations;

brush means arranged above said containers for rotation in an opposite direction with respect to said direction of advancement of said conveyor belt;

a pair of lateral containment walls secured to each said lateral guide member for closing said ends of said containers during advancement thereof;

wherein at least at positions adjacent to said frist trimming station and adjacent to said second trimming station there are provided securing means, said securing means securing products to be trimmed inside said containers during advancement thereof, said brush means comprising at least three substantially disc-like brushes, said brushes having rotation axes and being arranged facing said containers at locations longitudinally spaced-apart between said input end of said conveyor belt and said second trimming station, said rotation axes of said at least three brushes being arranged substantially perpendicular to said containers, whereby products which properly lie within said containers are forced by said securing means against said bottom of said containers thus preventing displacement and enabling precise trimming of the products, and whereby products which lie obliquely atop said containers are caused by said brushes to rotate and become positioned within said containers substantially parallel to said bottom thereof before being conveyed by said conveyor belt to said trimming stations.

2. An automatic trimming machine according to claim 1, wherein said securing means comprise rollers, at least one of said rollers being located adjacent to each of said trimming stations and having a plurality of peripheral teeth; said peripheral teeth being complementarily shaped to said containers, said rollers being formed of resilient material to gently compress products to be trimmed towards said bottom of said containers while permitting advancement thereof, each of said rollers being rotatable about an axis and secured to an arm, said arm being oscillably mounted on one of said trimming stations.

3. An automatic trimming machine according to claim 1, wherein each of said disc-like brushes includes a disc-shaped body, said disc-shaped body having a plurality of flexible appendages, said appendages being arranged peripherally on said dic-like body.

4. An automatic trimming machine according to claim 1, wherein said brushes are arranged adjacent to said lateral containment walls, proximate to each brush there being further provided a smooth ramp guide, said guide being arranged on said containment walls along said direction of advancement of said conveyor belt for causing obliquely lying products to cooperate with said brush means.

5. An automatic trimming machine according to claim 1, wherein said brush means comprise at least two brushes arranged between said input end of said conveyor belt and said securing means located adjacent to said first trimming station, and at least one brush located between said at least two brushes and said securing means adjacent to said second trimming station.

6. An automatic trimming machine according to claim 1, further comprising a plurality of nozzles, said nozzles being arranged for spraying water on said containers to facilitate displacement of products lying on said conveyor belt into said containers.

7. An automatic trimming machine according to claim 1, wherein each of said trimming stations includes a circular rotary blade, said rotary blade being operated by an electric motor and lying in a plane substantially perpendicular to the longitudinal direction of said containers, said rotary blade having a rotation axis and being arranged adjacent to one fo said ends of said containers, said trimming machine further comprising a partition, said partition projecting from said lateral wall and being linearly adjustable along a direction substantially parallel to said rotation axis of said rotary blade.

8. An automatic trimming machine according to claim 6, wherein said rotary blade and said electric motor are mounted on a secondary frame, said secondary frame being secured to said main frame.

9. An automatic trimming machine according to claim 1, wherein at said output end of said conveyor belt there is arranged a third trimming station, said third trimming station having a pair of lateral rotary blades, said pair of lateral rotary blades being operatable for effecting final calibration of trimmed products.

10. An automatic trimming machine according to claim 1, wherein said abutment means for adjusting the cutting depth of said trimming stations comprise a partition, said partition facing one of said ends of said containers for supporting tips or stems of products to be cut, said partition being adjustable along a direction substantially parallel to said containers by screw means.

11. An automatic trimming machine according to claim 1, further comprising lateral conveyor means, said lateral conveyor means including at least one underlying conveyor opposite each of said trimming stations for removal of cut stems or tips of products.

12. An automatic trimming machine according to claim 1, wherein each of said containers comprises a substantially gutter shaped body, said gutter shaped body extending transversely to said direction of advancement of said conveyor means, said gutter shaped body having a substantially V-shaped transverse cross section and being sized for accommodating horticultural products having different shapes and diameters.

13. An automatic trimming machine according to claim 1, wherein said conveyor belt includes an endless chain, said endless chain being operated by a motor, each of said containers having attached to said bottom thereof an oscillable connection element, said oscillable element being connected to said endless chain.

14. An automatic trimming machine according to claim 13, wherein said oscillable connection element comprises an attachment rod, a substantially U-shaped member secured to said endless chain for oscillably supporting said attachment rod and one of said containers.

15. An automatic trimming machine according to claim 1, wherein said means for imparting vibration comprise at least a vibration rod, said vibration rod having at least one end and at least one other end, said one end being connected to said lateral guide members said other end being eccentrically pivoted on an electrically driven wheel.

16. An automatic machine for trimming substantially elongate horticultural products, comprising a supporting main frame, a conveyor belt having an input end and an output end and being supported on said main frame, a plurality of elongate containers, said containers being arranged side by side along said conveyor belt for conveying horticultural products to be trimmed, said conveyor belt defining a direction of advancement, said containers being oscillably connected to said conveyor belt for tilting about axes said axes extending substantially parallel to said direction of advancement of said conveyor belt, guide members extending below and slideably supporting said containers and having a camming shape for causing said containers to tilt during advancement thereof from a first substantially horizontal position, to a second inclined position, from said second inclined position to a third inclined position, said third inclined position being oppositely inclined with respect to said second inclined position, and from said third inclined position to a forth substantially horizontal position, said trimming machine further comprising means for imparting vibrations to said longitudinal guide means, at least two trimming stations mounted on said main frame at locations corresponding to said second inclined position and said third inclined position, brush means overlying said containers for acting on products arranged improperly in said containers, wherein said trimming machine further comprises a toothed wheel of resilient material arranged adjacent each of said trimming stations, and toothed wheel having teeth complementary shaped with respect to said containers for cooperating therewith for securing products inside said containers during advancement of said conveyor belt towards said trimming stations, and wherein said brush means comprise at least three substantially disc-like brushes, said disc-like brushes rotating substantially tangentially to said containers about rotation axes, said rotation axes extending substantially perpendicular to said containers, there being further provided ramp guide means, said ramp guide means being arranged proximate to said brushes for aligning obliquely lying products within said containers.

* * * * *